(12) United States Patent
Chien et al.

(10) Patent No.: US 9,117,078 B1
(45) Date of Patent: Aug. 25, 2015

(54) MALWARE BEHAVIOR ANALYSIS AND POLICY CREATION

(75) Inventors: Hao-Liang Chien, Pingtung County (TW); Ming-Chang Shih, Taipei (TW); Ya-Hsuan Tsai, Taipei (TW)

(73) Assignee: Trend Micro Inc., Tokyo (JP)

( * ) Notice: Subject to any disclaimer, the term of this patent is extended or adjusted under 35 U.S.C. 154(b) by 1460 days.

(21) Appl. No.: 12/212,378

(22) Filed: Sep. 17, 2008

(51) Int. Cl.
*G06F 21/56* (2013.01)

(52) U.S. Cl.
CPC .................................... *G06F 21/566* (2013.01)

(58) Field of Classification Search
None
See application file for complete search history.

(56) References Cited

U.S. PATENT DOCUMENTS

| | | | | |
|---|---|---|---|---|
| 5,440,723 | A * | 8/1995 | Arnold et al. | 714/2 |
| 6,973,577 | B1 * | 12/2005 | Kouznetsov | 726/25 |
| 7,603,715 | B2 * | 10/2009 | Costa et al. | 726/25 |
| 7,620,992 | B2 * | 11/2009 | Monastyrsky et al. | 726/24 |
| 7,725,937 | B1 * | 5/2010 | Levy | 726/23 |
| 7,854,004 | B2 * | 12/2010 | van der Made | 726/23 |
| 7,877,802 | B2 * | 1/2011 | Marinescu | 726/22 |
| 8,201,244 | B2 * | 6/2012 | Sun et al. | 726/22 |
| 8,375,444 | B2 * | 2/2013 | Aziz et al. | 726/24 |
| 8,434,151 | B1 * | 4/2013 | Franklin | 726/24 |
| 2003/0135791 | A1 * | 7/2003 | Natvig | 714/38 |
| 2008/0016570 | A1 * | 1/2008 | Capalik | 726/23 |
| 2010/0031353 | A1 * | 2/2010 | Thomas et al. | 726/22 |

OTHER PUBLICATIONS

Bayer et al., TTAnalyze: A Tool for Analyzing Malware, 2006.*
Portokalidis et al., Argos: an Emulator for Fingerprinting Zero-Day Attacks for Advertised Honeypots with Automatic Signature Generation, ACM, 2006.*
Rieck et al., Learning and Classification of Malware Behavior, Springer-Verlag, Jul. 2008.*
Willems et al. Toward Automated Dynamic Malware Analysis Using CWSandbox, IEEE, Apr. 2007.*
Sanabria et al., Malware Analysis: Environment Design and Architecture, SANS Institute, 2007.*
White et al., Anatomy of a Commercial-Grade Immune System, IBM, 1999.*
Mell et al., Guide to Malware Incident Prevention and Handling, NIST, 2005.*
Sanabria et al., Malware Analysis: Environment Design and Archtecture, SANS Institute, 2007.*

* cited by examiner

*Primary Examiner* — Minh Dinh
(74) *Attorney, Agent, or Firm* — Beyer Law Group LLP (57) ABSTRACT

Creating a policy to be used by a malware prevention system uses multiple events triggered by malware. A sample of malicious computer code or malware is executed in a computer system having a kernel space and a user space. Event data relating to multiple events caused by the malicious code executing on the computer system are captured and stored. The event data is configured using a specific property that facilitates malware behavior analysis. A behavior list is then created utilizing the multiple events and associated event data. The behavior list, together with data in a malware behavior database, is used to derive a policy for use in a malware prevention system. The computer system is free of any malicious code, including viruses, Trojan horses, or any other unwanted software code. The malicious computer code executes without any constraints so that the execution behavior of the malicious code may be observed and captured. Critical events are selected based on the user's expertise and experience in dealing with malware and a sequential stream including the event as the events occur is created.

18 Claims, 10 Drawing Sheets

Event Structure

| No. | Time. | Proc ID | ImageName | Event Info |
|---|---|---|---|---|
| 1 | 0.00000 | 1925 | Explorer | Create File C:\Program Files\Debuggings Tools for Windows\windbg.ext |
| 2 | 0.12001 | 1324 | Msnmsgr | Write Registry Key HKLM\System\CurrentControlSet\Services\Tcpip\Para |
| 3 | 0.33657 | 1925 | Explorer | Call API ZwCreateThread |
| 4 | 0.99102 | 1324 | Msnmsgr | Create File C:\Deocuments and Settings\aawen shn\PatternGenerator |
| 5 | 1.22456 | 1925 | Explorer | Create Process C:\Program Files\Debugging Tools for Windows\windbg. |
| 6 | 2.44512 | 1925 | Explorer | Call API ZwMapVirtualMemory |
| 7 | 2.97442 | 1100 | test | Write Registry Key HKLM\Software\Microsoft\Windows NT\Current |
| 8 | 3.80011 | 1100 | test | Create File C:\Program Files\Debugging Tools for Windows\windbg.exe |

Event List Pane

Registry Event
☐ Subject: Process
　　Subject Process ID : 1100
　　Subject Process Image Path : C:\windows\test.exe
☐ Object Registry
　　Registry Key: HKLM\Software\Microsoft\Windows NT\CurrentVersion\Windows
　　Registry Key Value : Appinit_DLLs
Operation : Write Event Detail Pane

MALWARE BEHAVIOR ANALYSIS AND POLICY CREATION

BACKGROUND OF THE INVENTION

1. Field of the Invention

The present invention relates to computer network security. More specifically, it relates to software and computer systems for creating policies for malware detection and behavior analysis systems.

2. Description of the Related Art

A conventional malware detection and prevention system may operate using malware policies developed for detecting potentially malicious behavior in a computer system. The accuracy and efficiency of such a system depends in large part on the specificity of the policies which it uses to operate. Presently, polices are developed using single events. This limits the abilities of the malware detection system. Processes for analyzing malicious system behavior analyze a single event that results from the malware operating on the system. This may be too narrow and may limit the functionality of the malware detection and prevention system. Analysis based on a single event results in malware policies that are not very precise and which may result in a high frequency of false positives. That is, when a "white list" is checked in the malware prevention system, the event being checked may be in the white list but should not be because it may be part of a malicious process stream. Generally, it is difficult to characterize malicious behavior by examining one event. However, presently it is difficult to obtain policies that are derived from examining multiple events in malicious behavior process streams. For example, conventionally, malware executes on a PC and when the malware's behavior on the PC is analyzed, a single event that is believed to be caused by the malware is used to derive a policy, which is used by the malware detection and prevention system. This system uses a white list to determine which events are acceptable and the white list, in turn, is determined by the policy. If the policy is not precise, then there is a high occurrence of false positives using the white list. Thus, it would be desirable to have a more precise process and system for making malware detection/prevention policies.

SUMMARY OF THE INVENTION

In one embodiment, a method of creating a policy to be used by a malware prevention system is described. A sample of malicious computer code or malware is executed in a computer system having a kernel space and a user space. The computer system is connected to a malware prevention system. Event data relating to multiple events caused by the malicious code executing on the computer system are captured and stored. The event data is configured using a specific property, such as process, that facilitates malware behavior analysis. A behavior list is created utilizing the multiple events and associated event data. The behavior list is then used, together with data in a malware behavior database, to derive a policy for use in a malware prevention system. In one embodiment, the computer system is free of any malicious code, including viruses, Trojan horses, or other malicious software code. The malicious computer code sample executes without any constraints so that the execution behavior of the malicious code may be observed and captured. In another embodiment, critical events are selected and a sequential process stream including the event as the events occur is created.

Another embodiment is a computer system for creating a policy for use in a malware detection system. The system includes a processor and a system behavior analysis component. The analysis component may include an event capture module, an analysis module, and a policy creation module. The computer system also has a memory that may contain a malware behavior database that stores malware samples and results from parsing the samples for analysis. It may also contain event data describing an event caused by malicious computer code. In one embodiment, the computer system does not have any malware. In another embodiment, the event capture module captures the effects of the malicious computer code execution. In another embodiment, the computer system also includes an activity monitor and an event manager operating in the kernel space of the computer system. The event capture module also includes an event receiver for interfacing with the activity monitor. In another embodiment, the analysis module includes a filter manager for identifying events having a specific process identifier and an analyzing manager for creating a process stream. The event data is configured to include a subject field, an operation field, and an object field.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for creating malware behavior lists which are utilized to derive malware detection policies in malware detection and behavior monitoring systems ("malware detection systems") are described in the various figures. As is known in the field of malware detection, policies for malware detection systems are typically developed by an anti-malware or computer security service provider who supplies malware detection systems to customers. Malware detection policies are often developed by service providers in a controlled environment, such as in a computer software lab.

For example, policies may be developed by executing or running samples of new malware (e.g., a new virus strain) on malware-free operating systems ("clean PCs") in the service provider's computer lab. The service provider carefully observes and analyzes single events created by the malware sample (as described above). In this manner, the service provider derives the malware's behavior. Samples are often obtained by service provider employees and associates from the "real world" computing environment, typically the Internet.

Observing behavior of the sample malware includes identifying critical events that result during execution of the malware and creating malware behavior lists. Although not included in present invention, it is from these malware behavior lists that malware detection policies may eventually be created for use on malware detection systems.

Figure 1:
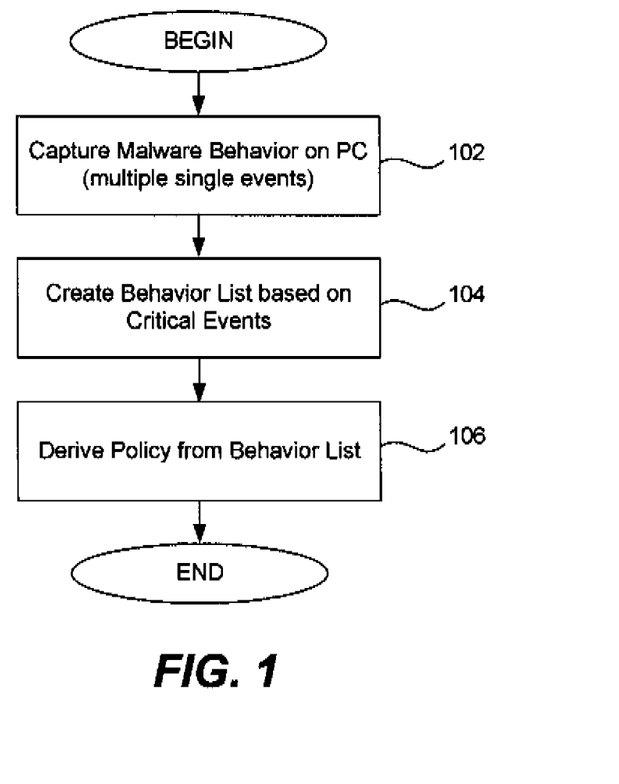
FIG. 1 is a flow diagram showing a process of deriving a behavior list for malware detection system policy in accordance with one embodiment of the present invention.

FIG. 1 is a high-level flow diagram of a process of deriving a malware detection policy using a behavior list in accordance with the first embodiment of the present invention. As noted, this process executes in a controlled environment, such as a computer software lab operated by an anti-malware service provider, such as TrendMicro, Inc. of Cupertino, Calif. Before the first step is performed, the service provider or related obtains a malware sample from an external environment. The sample may be a new outbreak of a virus which the service provider obtained and has delivered to the provider's lab. The service provider executes the malware sample, which may be referred to more generally as an unknown malicious process, on a virus-free client having a clean operating system. That is, the service provider lets the malware code run freely on the PC, simulating malware execution in a real world environment. Malware may be malicious processes such as BOTS, Trojan horses, Instant Messages, Worms, malware that exploits software from specific vendors (e.g., Microsoft) and thousands of other specific malware samples.

At step 102 the service provider executes the malware code sample (which may be the entire malware program) on a clean PC and captures and records the malware behavior on the PC. In one embodiment, the service provider records this behavior by creating a data record for each event that results from the malware. In one embodiment, when the malware begins execution on the PC and the service provider employee, such as a virus expert ("user") initiates an event capture process utilizing a software capture module, described below, and certain user interfaces also described below. As noted earlier, the malware is allowed to operate freely on the clean PC without any constraints so that the full effect of its behavior may be observed and captured. The user stops the event capture process of step 102 when she believes that the malicious process has essentially "run its course." The user may make this decision, for example, by observing whether certain critical files have been modified or whether specific activities in the operating system have occurred, activities that malware would normally cause. The user exercises her professional discretion to decide when to stop the event capture. If the sample malware is from an entirely new breed of malicious software and does harm that previous malware did not, the user may simply allow events to be captured for a longer time and collect a larger sampling of events. As described below, the user may end event capturing via an event capture dialog box.

At step 104 the user creates a malware behavior list based on events captured at step 102. In one embodiment, a behavior list is a sequence or stream of events that are characteristic or clearly indicative of execution of the malware sample. Examples of events include write to file, read file, append file, create registry, call API, file I/O, terminate, and others. As is known in the art, not all of the events caused by the malware sample are necessarily malicious; some may be harmless or routine steps which many non-malicious processes would normally execute. Some events may even be "red herrings," or events that are intended to mislead or divert attention from the actual malicious behavior. The user, having expertise in virus and malware behavior, selects the appropriate critical events and creates a behavior list, as described below. The user may select multiple events from an event list which she considers to be critical or significant with respect to characterizing the behavior of the malware or for detecting the malware. In this manner, multiple events are used to create one or more behavior lists. At step 106 the behavior lists are provided so that they may be used to derive or extract policy or, more specifically, policies that are used in behavior monitoring analysis which may be one component in a malware detection system. A policy database of the malware detection system is updated with the new policies. The policy database may also be referred to as a malware database.

Figure 2:
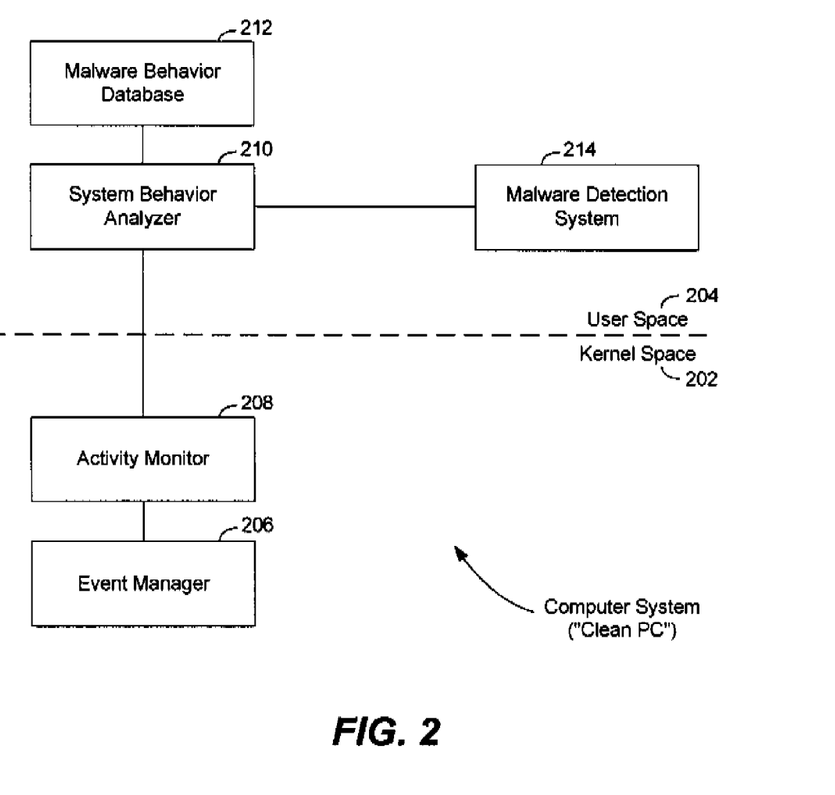
FIG. 2 is an overview block diagram showing components and connections relevant to one embodiment of the present invention.

FIG. 2 is an overview block diagram of a computer system 200 showing components and connections relevant to one embodiment of the present invention. Most of the components reside in a user space 204 and some in a kernel space 202 of a clean PC, the demarcation shown by the dashed line. As described in FIG. 1, these components and their related processes reside and take place in a controlled environment and virus-free operating system. Once the malware sample has been downloaded or installed on the computer 200, which may emulate, for example, a client PC in a network, a home computer, a server, or a mobile computing device, the user lets the malware run, as described above. At this stage an event manager 206 in kernel space 202 begins monitoring behavior of the executing malware. Event manager 206 manages system interfaces (also referred to as system "hooks"). In order to "monitor" events, event manager 202 may use a mini-filter to obtain data on system events caused by the malware and transmit this data to an activity monitor 208. A user mode hook may be used to collect application events and other events in the user space. Obtaining system events at this stage in kernel 202 by event manager 206 different from (and is a sense complements) the capturing of non-system events in user space 204, as described below. Event manager 206 transmits system event data in kernel 202 to an activity monitor 208 which performs as an interface between event manager 206 and components in user space 204. Activity monitor 208 receives events from event manager 206 and transmits them to system behavior analyzer 210. In one embodiment, a malware detection system may have drivers to perform the functions of event manager 206 and activity monitor 208.

Activity monitor 208 interfaces with system behavior analyzer 210 in user space 204. Analyzer 210 is a software component with modules that perform various functions, such as event capturing and analysis, and is described in greater detail in FIG. 3. In another embodiment, analyzer 210 may be embodied in firmware on a suitable hardware component. As a software component, it may reside in computer memory, such as ROM, RAM, non-volatile memory, cache memory, or other suitable storage media. It may also be stored on a CD-ROM, USB key, or other portable memory device. Analyzer 210 shares data with a malware database 212, which it uses for certain analysis functions. When a policy has been derived by analyzer 210 based on a behavior list, the policy is transmitted to malware detection system, which includes behavior monitoring functionality monitor 214. The policy may be transmitted to a "streaming policy" list that stores various policies utilized by detection system 214 (a list of streaming policies contains policies that are not based upon detection of only a single event, but rather are based upon detection of multiple events or a "stream" of sequential events).

Figure 3:
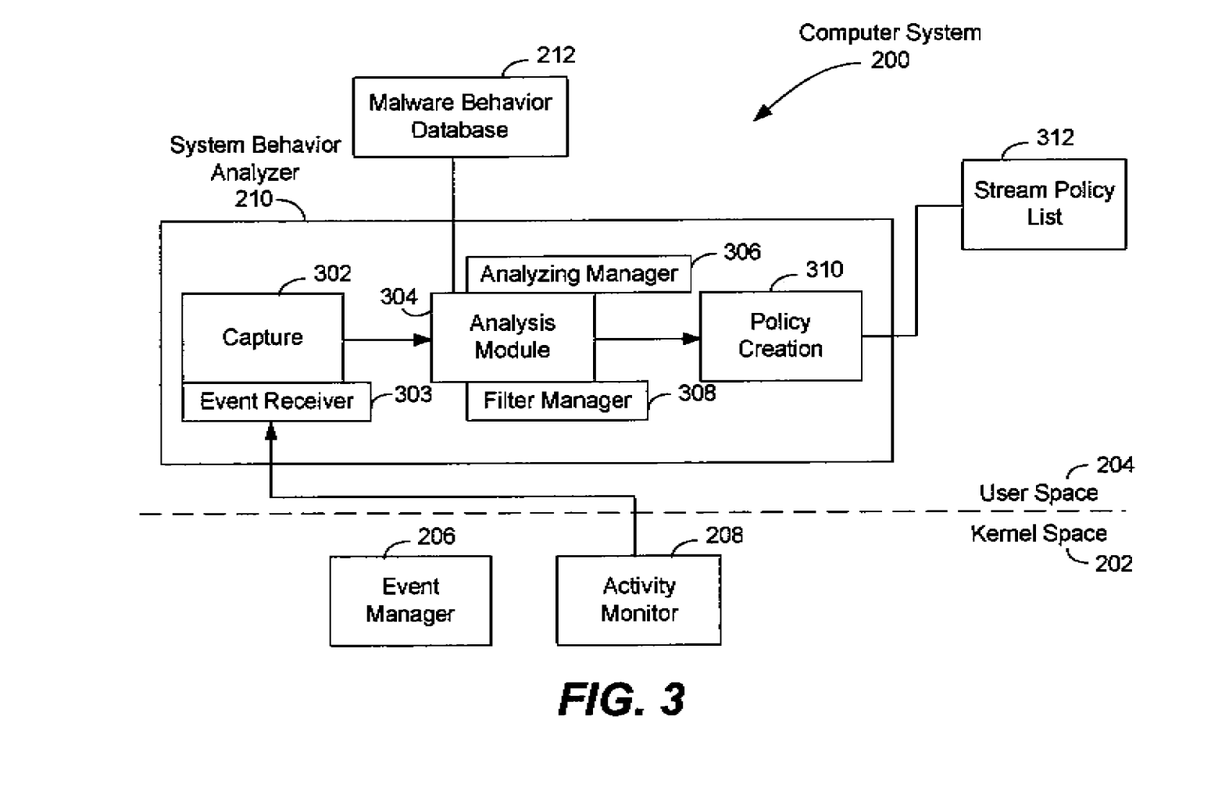
FIG. 3 is a detailed logical block diagram of a system behavior analyzer in accordance with one embodiment.

FIG. 3 is a logical block diagram of system behavior analyzer 210 in accordance with one embodiment. As described above, activity monitor 208 in kernel space 202 transmits event data (via activity monitor 208) to behavior analyzer 210. In one embodiment, an event capture module 302 in analyzer 210 receives the event data. Event capture module 302 creates a sequential event stream made up of events as they occur; that is, event capture manager 302 creates a time-based list of events. The list of events is transmitted to analysis module 304. In one embodiment, event capture module 302 has an event receiver module 303 that directly interfaces with activity monitor 208 and receives the actual event data as it is transmitted from kernel space 202 to user space 204.

Figure 4:
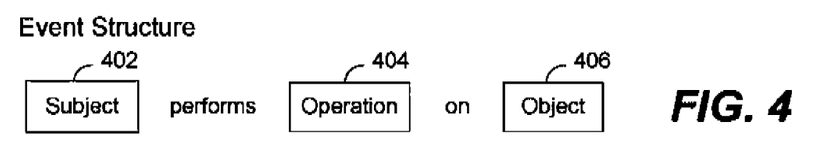
FIG. 4 is a block diagram showing a format of an event in accordance with one embodiment.

FIG. 4 is a block diagram showing a format of an event in accordance with one embodiment. An event includes three components: a subject 402, an operation 404, and an object 406. Subject 402 performs operation 404 on object 406. Examples of subjects include ProcessLive, ProcessAny, and Process. Examples of operations include create, call, write, erase, and the like. Examples of objects include directories, registries, APIs, etc. The event data is configured in to this format by event capture module 302. The formatted event data is sent to analysis module 304.

In one embodiment, analysis module 304 uses a filter manager 308 to parse and filter the event stream created by event capture module 302. As described above, an event in an event stream is caused by execution of the sample malware. The event stream may be analyzed by a user using malware database 212, where data on the sample malware (e.g., virus, Trojan horse) behavior is stored. In one embodiment, malware database 212 stores a listing of malware samples, of which there may be thousands. It also contains results from parsing these malware samples, such as registries, file operations, and event sequences. These parsing results generally describe the behavior and actions that are characteristic of the malware samples. Analysis module 304 may transmit data to and receive data from malware database 212. Analysis module 304 enables the user to create a behavior list. Described in more detail below, a behavior list is a list of events selected by the user which characterize or is representative of behavior of the sample malware. There may be more than one behavior list for each sample malware. The use may perform this task using analysis manager 306 and various user interfaces described below. The behavior list is transmitted to a policy creation module 310 which creates a policy based on the behavior list for use in a malware detection system using behavior analysis. In one embodiment, a policy is comprised of one or more rules. A rule may have, generally, the same format as an event. The policies, comprised of rules, are stored in a rules database, which may also be referred to as a stream-list policy file, in the malware detection system. Each time the malware detection system, the file or database is loaded into the system's memory. The policy, which may be referred to as a "multi-event" behavior policy, is then transmitted to a rules database 312 (a component in malware detection system 214). Module 310 may be used to create a policy. For example, a policy may contain numerous rules such as:

Rule 1: Subject "Any process", Operation "Create", Object "Other Process"
Rule 2: Subject "Any process", Operation "Open", Object "File-wshtcpip.dll"
Rule 3: Subject "Any process", Operation "Open", Object "File-kernel32.dll"
Rule 4: Subject "Any process", Operation "Open", Object "File-RTUTILS.dll"
Rule 5: Subject "Any process", Operation "Open", Object "File-RASAPI32.dll"
Rule 6: Subject "Any process", Operation "Create", Object "Mutex-RasPbFile"
Rule 7: Subject "Any process", Operation "Open", Object "File-rpert4.dll"

Figure 5:
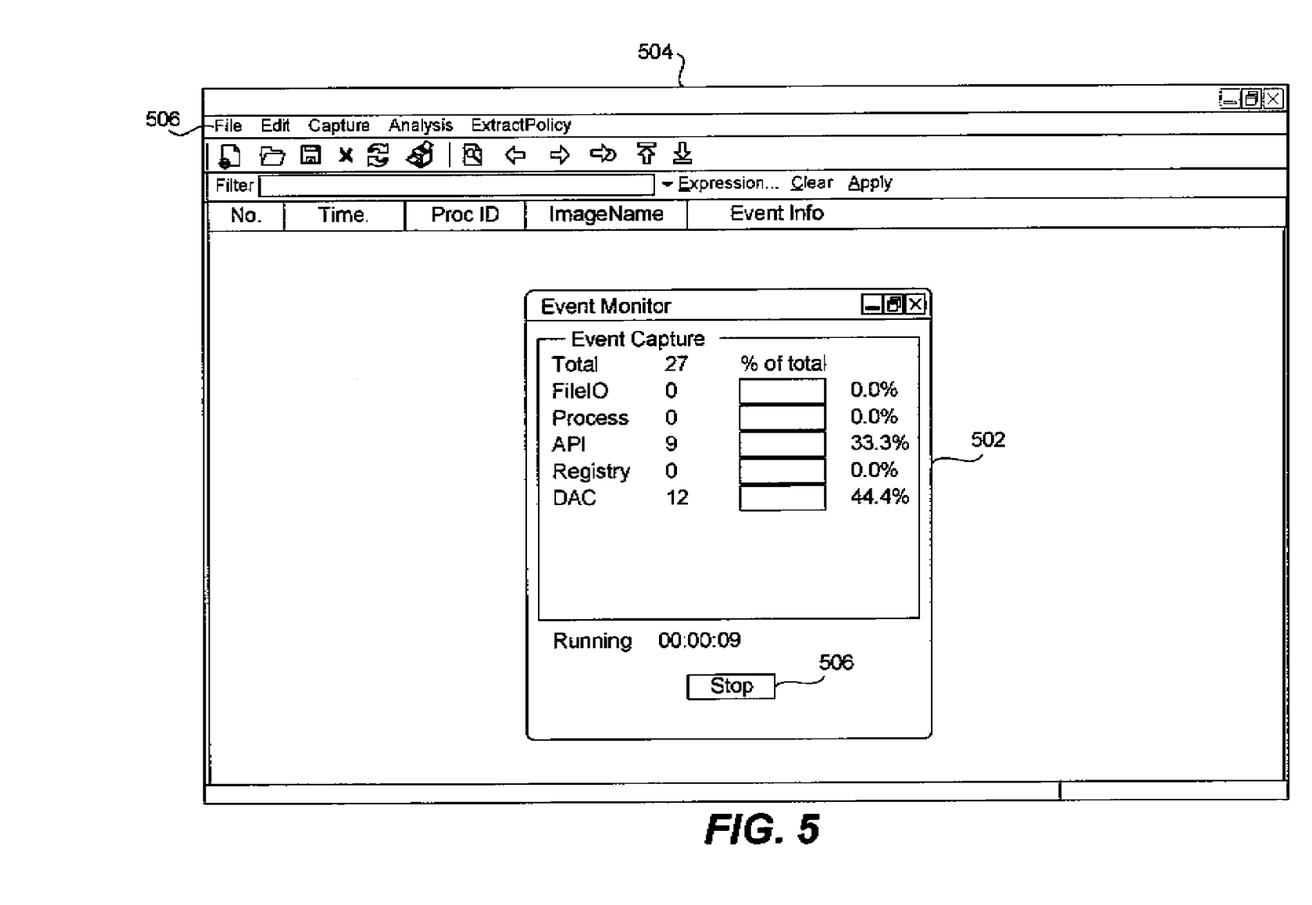
FIG. 5 is a sample screen shot of a user interface related to capture module.

FIG. 5 is a sample screen shot of a user interface related to event capture module 302. It shows one example of a screen configuration for obtaining data from a user and displaying the data. Many variations of this configuration may be used to design other screen shots. A dialog box 502 is shown in a system behavior analyzer screen 504. In a top menu bar 506 the user can select one of three functions (in addition to "File" and "Edit"). They correspond to the modules 302, 304, and 310 in system behavior analyzer component 210, namely, "Capture" "Analysis" and "ExtractPolicy". If the Capture option is selected, dialog box 502 is displayed and the user may begin an event capture sequence for the sample malware. That is, the malware will start executing (or may already be executing) and capture module 302 begins operation. Dialog box 502 may display various types of information, such as the total number of events captured and event category. The percentage of the total for each type of event may also be provided. For example, API events comprise 33.3% of all event captured. In other embodiments, this information may not be provided or may be displayed in a different format. At the bottom of box 502, the total running time of the event capturing function is provided (in this example, 9 seconds) and a button 506 which the user may click on to stop the event capturing at which stage capture module 302 will cease operation. As noted above, the amount of time that the event capture run may be decided by the user and may depend on various factors such as which files have been affected, occurrence of certain events, total number of events captured, and the like.

Figure 6:
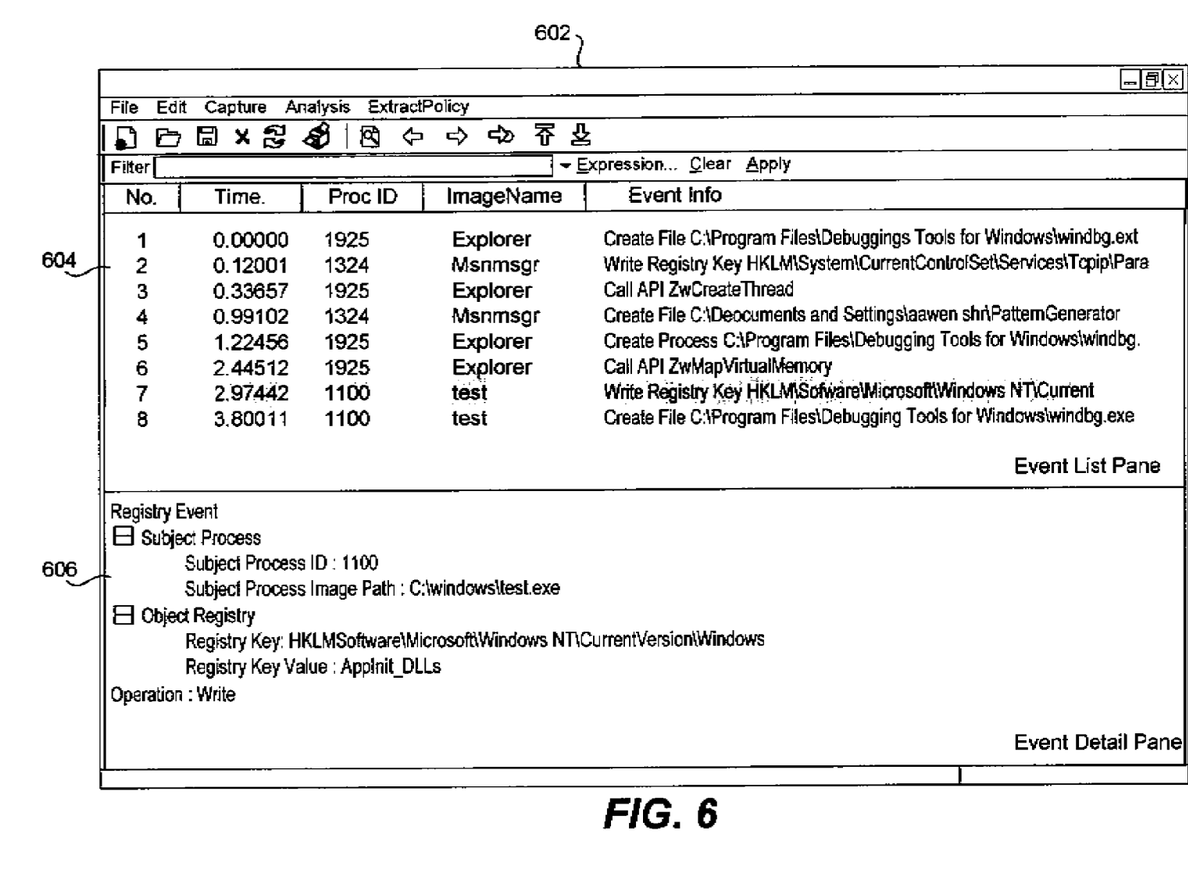
FIG. 6 is a sample screen shot of a user interface showing an event listing.

FIG. 6 is a sample screen shot of a user interface showing an event stream. A screen 602 has a first window 604 (top) and a second window 606 (bottom). Screen 602 shows the same three options as shown in menu bar 506 (Capture, Analysis, and ExtractPolicy). Window 604 displays an event stream, a time-based listing of events that were captured and formatted in the previous (event capture step). The event stream is now presented in a manner that facilitates examination by the user for the purpose of creating a behavior list.

In one embodiment, there is a column showing a sequential number for each event in this (e.g., 1 to 8) and another column ("Time") showing the time at which each event began. Here the first event shown happens to be the first event to be captured and, thus, shows a time of 0.00000. The second event started at 0.12001, the third at 0.33657, and so on. Also shown is a process identification ("Proc ID") column which displays an identifier having a 4-digit format (in this example) that identifies a process. An event typically executes as part of a process and this "Proc ID" data informs the user in which the event executes of which process the event executes. Events 1, 3, 5, and 6 execute in process 1925 and events 2 and 4 execute in process 1324. Also shown is an "ImageName" column that may contain a process name (e.g., Explorer, MSNMessenger). The last column in window 604 is an "Event Info" column which provides more information on the event. Some examples are "Create File C:\ . . . . " "Write Registry Key HKLM . . . " and "Call API ZwMapVirtual . . . ". In one embodiment, the Event Info column provides sufficient information to identify subject 402, object 406, and operation 404 of an event.

The user can select an event record, such as the highlighted record 605 with event number 7 in window 604 and view the event data in greater detail and in an alternative format as shown in window 606. Window 606 may be referred to as an Event Detail Panel. Here the data is presented in a more readable format that may facilitate analysis by the user. At the top, the name or category of the event is provided, e.g., "Registry Event." Below that, the subject is provided, "Process" together with an identifier for that subject ("1100") and a process image path. Below that, the object is provided, "Registry," along with information relevant to the "Registry," such as registry key and registry key value. The information provided will depend on the nature of object 406 and subject 402. Finally, the operation is provided, "Write." This detailed event information may be provided for each event selected in window 604.

Figure 7:
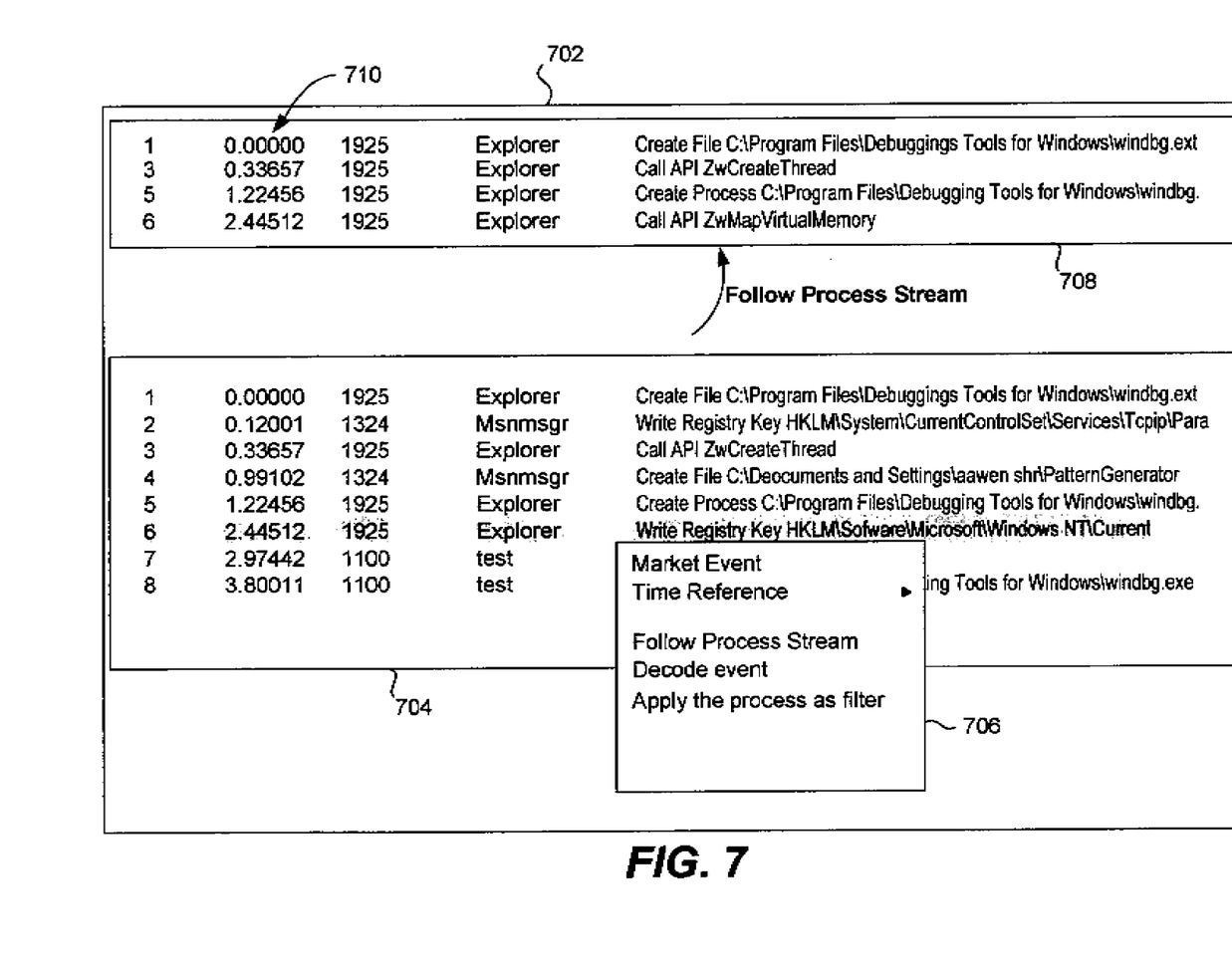
FIG. 7 is a sample screen shot of a user interface related to the analysis module.

FIG. 7 is a sample screen shot of a user interface related to analysis module 304. In one embodiment, the bottom portion of a screen 702 is a window 704 that has content similar to the content in window 604. In window 704 there are eight event records displayed (as in window 604). Event record number 6 is selected. When an event is choose, the user can select the "Analysis" option described earlier (not shown in FIG. 7). The user may do this to analyze a specific process steam. A process stream is based on an event stream (events having the same process identifier). That is, the event selected (or any event) belongs to at least one particular process, the process having a "Proc ID," as described in FIG. 6. When the Analysis option is selected, a window 706 is displayed providing the user with various options, namely, Follow Process Stream, Decode Event, and Apply the Process as Filter.

To analyze the highlighted event, the user selects the Follow Process Stream option. Analysis module 304 initiates filtering the selected event, in that, module 304 collects all events that are part of the same process that were captured during the event capturing period. More specifically, filter manager 308 applies a display filter to the events displayed in window 704. The output of this filtering (which was initiated by selecting the Follow Process Stream option) is displayed in top window 708, which appears when the analysis is complete. In one embodiment, the event records that are output from the filtering are displayed in sequential order (as indicated in the time field 710). In this example, event records 1, 3, 5, and 6 are displayed, all belonging to process having Proc ID 1925, the same process of the event record selected in window 704. In one embodiment, the same event data is displayed in the same format in Process Stream analysis window 708, that is, the first column is event record number, the second is start time, followed by process identifier, image name, and event information. The process stream shows events having the same Proc ID in the same order as they occurred on the PC. The user may also select "Apply the process as a filter" option which causes the behavior analysis system to use the process identifier as a filtering condition to filter the process stream or continuously receive events from the specific process. The "Decode event" option allows the user to show the detail of the selected event. MarkedEvent option is used to highlight the selected event.

Figure 8:
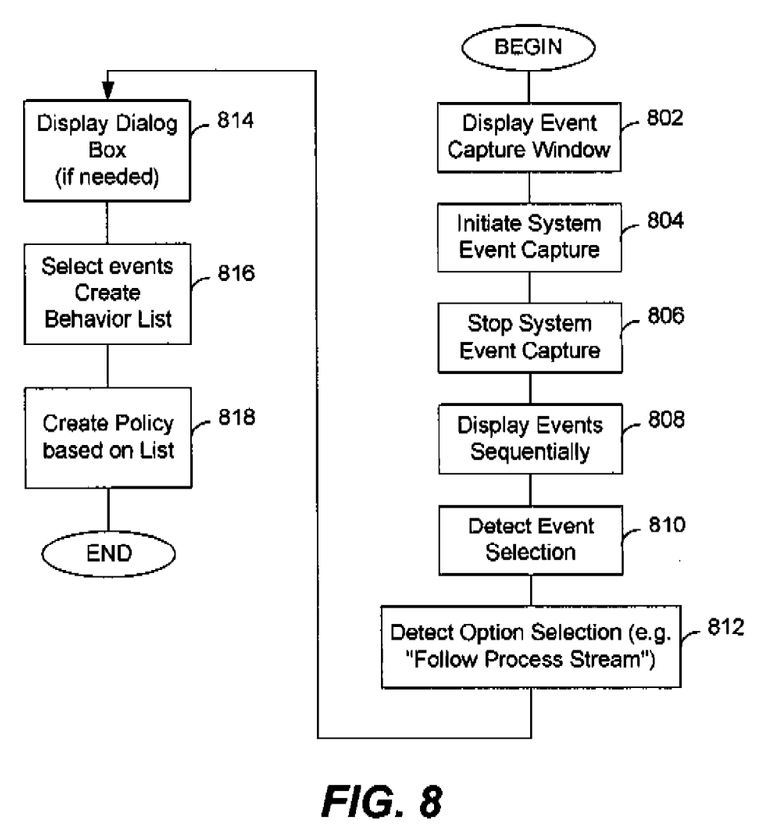
FIG. 8 is a flow diagram of a process of capturing events, analyzing them, and creating a behavior list in accordance with one embodiment.
Figure 9:
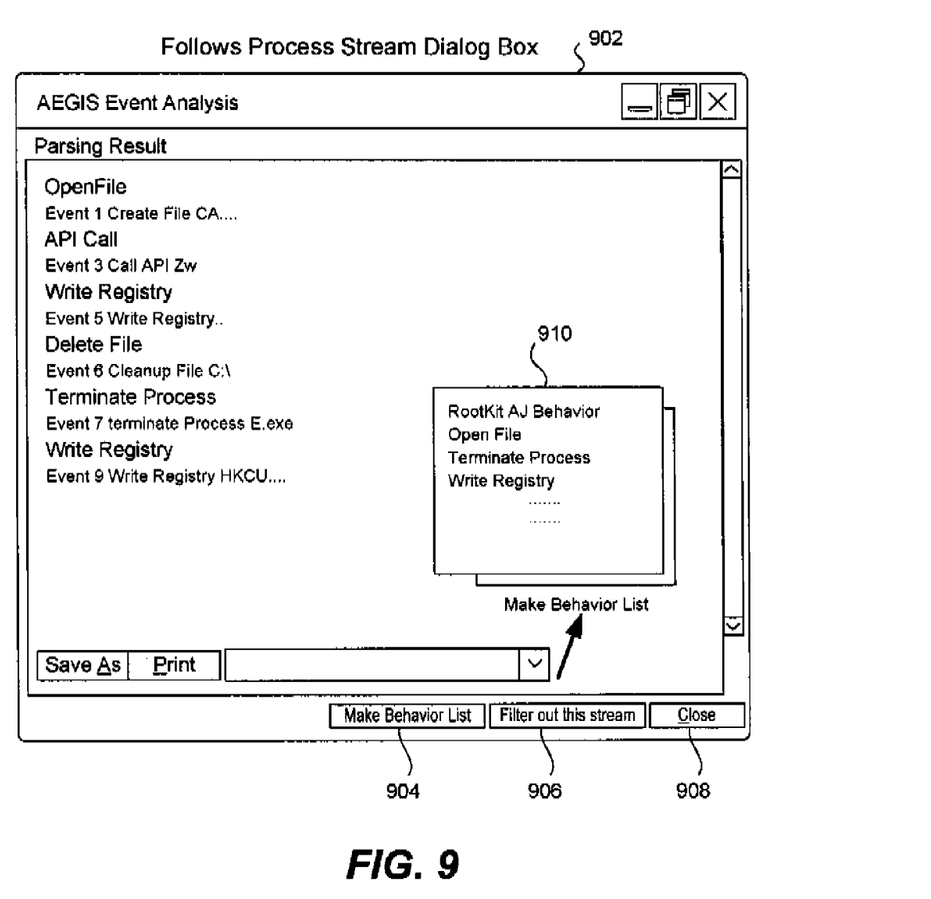
FIG. 9 is a sample screen diagram of a Follow Process Stream dialog box in accordance with one embodiment.

FIG. 8 is a flow diagram of a process of capturing events, analyzing them, and creating a behavior list in accordance with one embodiment. At step 802 event capture module 302 in system behavior analyzer 210 displays event capture window 502 which enables the user to initiate an event capture on an executing malware sample on a virus-free PC. At step 804 system behavior analyzer 210 initiates event capture (i.e., it begins examining activity in kernel space 202) which, in turn, invokes event manager 206 and activity monitor 208. At step 806 event capturing is stopped as instructed by the user pressing stop button 506 in display event capture window 502. At step 808 the captured events are displayed sequentially as shown in window 604. In other embodiments, they may be displayed based on other criteria, such as event type. At step 810 the user selects an event and this selection is detected by analysis module 304. The user selects an event based on the user's belief that the event was caused by the malware. The user may already know which malware they are examining. The user may already have knowledge to identify critical events caused by the malware. At step 812 analysis module 304 detects that the user has selected one of the options available for analyzing the selected event. For example, the user may select the "Follow Process Stream" option in dialog box 706. The user may also select "Apply the process as filter" option or one of the other options described above. At step 814 window 708 is displayed, if needed. This same data may also be presented in a different format as shown in FIG. 9. At step 816 the user examines the events belonging to a specific process and selects events that she believes are significant or relevant in characterizing the sample malware and create a behavior list. The user may create more than one behavior list from the events. At step 818 a policy for use in the malware detection system using a behavior analysis approach is created based on a behavior list. The policy is stored in the malware detection system.

FIG. 9 is a sample screen diagram of a Follow Process Stream dialog box in accordance with one embodiment. A dialog box 902 is titled "Parsing Result" and shows in more detail and in a different format event data that was also displayed in top window 708 of FIG. 7. Some of the events shown are Open File, API Call, Write Registry, Delete File, Terminate Process, and Write Registry. Dialog box 902 presents the events in a format that allows the user to clearly see the type of event more generally. As noted, it is essentially the event data that results from selecting the "Follow Process Stream" option in window 704. The event number and event information (as described in window 604) are also shown, but less prominently. From box 902 the user may select one of the following options: Make Behavior List 904, Filter out this Stream 906, or Close 910. The relevant option for the present invention is Make Behavior List 904. The user selects multiple events and presses the "Make Behavior List" option 904. The events selected will depend on the user's experience in dealing with malware behavior issues. Selection of events may also depend on a query result from the malware database 212. This may occur before window 902, the behavior monitoring system sends the process behavior to malware database and provides a list of possible malicious events. The user can choose the malicious events to create the behavior list. The user may assign a name to the behavior list, such as "RoolKit AJ Behavior List," as shown in FIG. 9. For Rootkit AJ Behavior List 910, the user selected Open File, Terminate Process, and Write Register events from the process. If the user selects "Filter out the Stream" option 906, the interface may return to window 604 and may only show events of the process selected for filtering.

Figure 10:
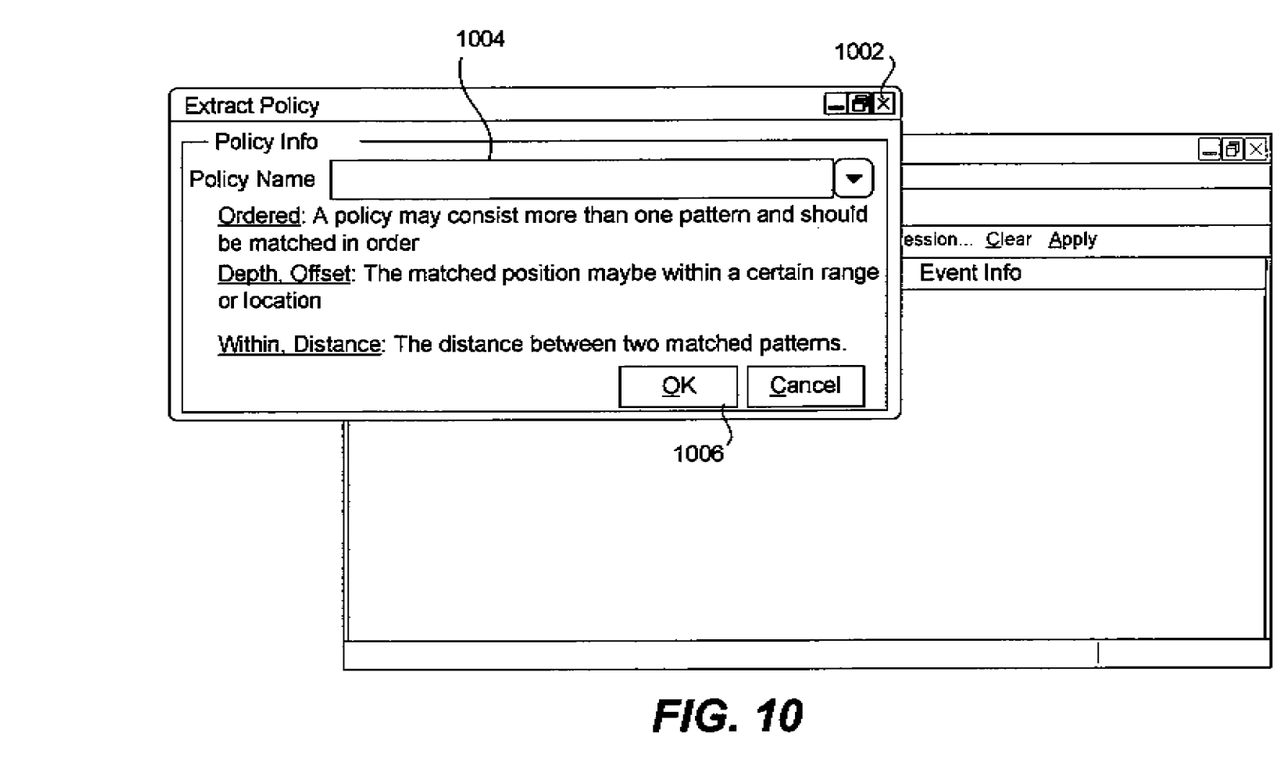
FIG. 10 is a sample screen diagram showing another dialog box which allows a user to create and name a policy in a text input window.

FIG. 10 is a sample screen shot showing a dialog box 1002 which allows a user to create (or "extract") and name a policy in text-input window 1004. As noted above, the policy is used in a malware detection system that includes behavior monitoring. After the user enters a policy name, the policy may be saved and sent to malware prevention system by pressing the OK button 1006. Also shown are three links, "Ordered," "Depth, Offset," and "Within, Distance." The user may select any of these links and enter further data. The values entered for these options are determined by the user based on her experience. The user may also use malware database 212 which contains data on malware behavior, such as dropping files, API calling sequences, dropping registers, and the like. Malware database 212 may contain registry changes and file changes describing what the malware does (e.g., an image name, operation, directory data, and other data). Database 212 may also contain event sequence data on the order of specific events caused by the malware. The event sequence may contain the number of the event, a process identifier, event time, event name, and argument names and values. The user may create more than one behavior list from the malware sample. For example, the user may believe that the malware can be characterized by different sequences of events and may want a separate behavior list for each event sequence. As described above, an event is a subject+operation+object. This same format may be used in the policy. A policy is comprised of a series of rules that may have the same format as an event. Further detail on these options and implementations of policies in a malware detection system is provided in patent application Ser. No. 12/212,250, titled "Multi-Behavior Policy Matching for Malware Detection," filed on Sep. 17, 2008, which is incorporated herein by reference in its entirety and for all purposes.

Figure 11A:
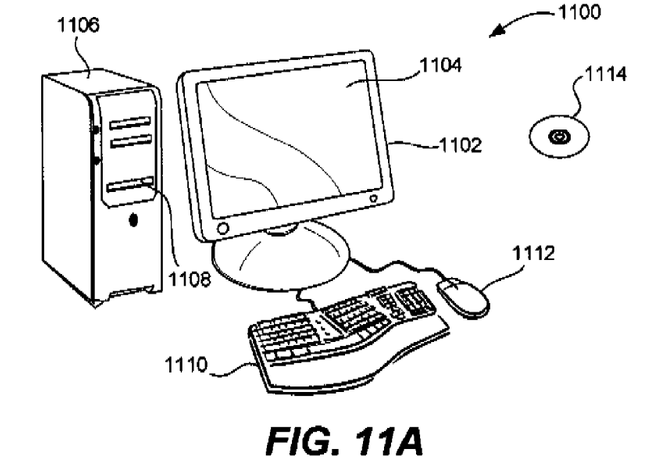
FIGS. 11A and 11B illustrate a computer system suitable for implementing embodiments of the present invention.
Figure 11B:
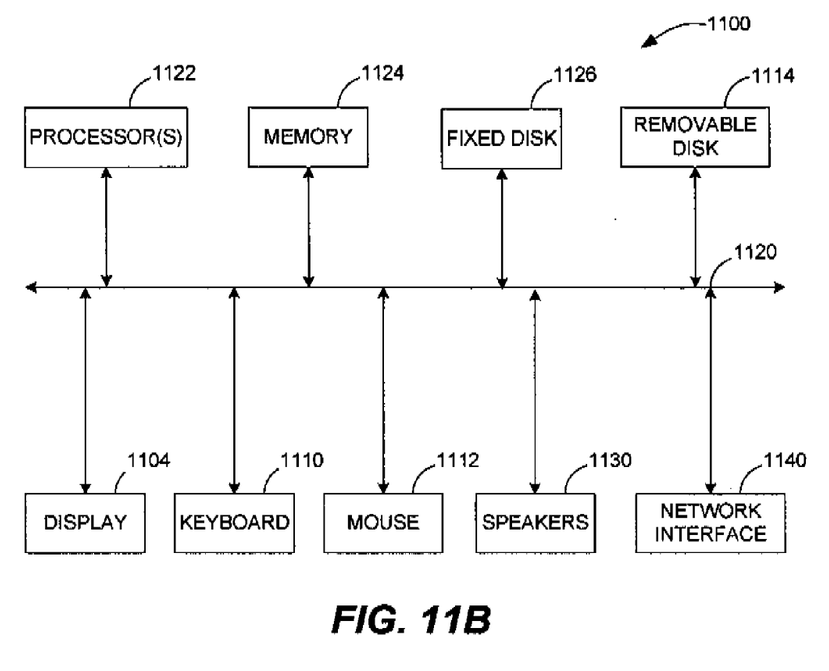

FIGS. 11A and 11B illustrate a computer system 1100 suitable for implementing embodiments of the present invention. FIG. 11A shows one possible physical form of the computer system. Of course, the computer system may have many physical forms including an integrated circuit, a printed circuit board, a small handheld device (such as a mobile telephone, handset or PDA), a personal computer or a super computer. Computer system 1100 includes a monitor 1102, a display 1104, a housing 1106, a disk drive 1108, a keyboard 1110 and a mouse 1112. Disk 1114 is a computer-readable medium used to transfer data to and from computer system 1100.

FIG. 11B is an example of a block diagram for computer system 1100. Attached to system bus 1120 are a wide variety of subsystems. Processor(s) 1122 (also referred to as central processing units, or CPUs) are coupled to storage devices including memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1126 is also coupled bi-directionally to CPU 1122; it provides additional data storage capacity and may also include any of the computer-readable media described below. Fixed disk 1126 may be used to store programs, data and the like and is typically a secondary storage medium (such as a hard disk) that is slower than primary storage. It will be appreciated that the information retained within fixed disk 1126, may, in appropriate cases, be incorporated in standard fashion as virtual memory in memory 1124. Removable disk 1114 may take the form of any of the computer-readable media described below.

CPU 1122 is also coupled to a variety of input/output devices such as display 1104, keyboard 1110, mouse 1112 and speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1122 optionally may be coupled to another computer or telecommunications network using network interface 1140. With such a network interface, it is contemplated that the CPU might receive information from the network, or might output information to the network in the course of performing the above-described method steps. Furthermore, method embodiments of the present invention may execute solely upon CPU 1122 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

We claim:

1. A method of creating a malware detection policy, the method comprising:

executing malware code in a malware-free computer system connected to a malware prevention system;

capturing event data caused by the malware in the computer system, wherein said capturing is performed for a length of time determined by a user and an event capture window is displayed while the event data is being captured;

formatting the event data into a subject field, and operation field, and an object field;

configuring the event data according to processes executing on the computer system from the malware code, thereby facilitating behavior analysis of the malware code;

providing a user interface for said user to select specific event data to create a behavior list based on input from said user;

creating a behavior list utilizing the event data selected by said user; and deriving, via a malware policy creation module, a malware detection policy from the behavior list, the malware detection policy including a set of rules in which each rule includes a subject, an operation, and an object; and providing the malware detection policy to a malware detection system.

2. A method as recited in claim 1 wherein executing malware further comprises executing the malware code without any constraints, thereby enabling observation and capture of the malware code execution behavior.

3. A method as recited in claim 1 wherein executing malware code further comprises: detecting and obtaining events in a kernel space and in a user space of the computer system.

4. A method as recited in claim 1 further comprising creating a data record for an event that is performed by the malware.

5. A method as recited in claim 1 further comprising creating a sequential process stream wherein all events in the process stream belong to the same process.

6. A method as recited in claim 1 wherein the behavior list includes a plurality of event data records having the specific format.

7. A method as recited in claim 1 wherein deriving a malware detection policy further comprises utilizing a malware database storing malware behavior data.

8. A method as recited in claim 1 wherein the specific event data selected to create a behavior list is indicative of execution of said malware.

9. The method of claim 1, further comprising providing a user interface for the user to indicate length of time.

10. A malware-free computer system for creating a malware detection system policy, the malware-free computer system comprising:
   a processor;
   a system behavior analyzer component including an event capture module, an analysis module, and a policy creation module, wherein the event capture module performs a capturing function for a length of time as determined by a user;
   a malware behavior database that includes malware sample listings and malware parsing results; and
   event data describing an event caused by malicious computer code, said event data formatted into a subject field, an operation field, and an object field, wherein a behavior list is created by the user providing input relating to selection of specific event data;
   a policy creation module to create a malware detection policy based on the behavior list created by the user and provide the malware policy to a malware detection system, wherein a malware policy includes a set of rules in which each rule includes a subject, an operation, and an object.

11. A computer system as recited in claim 10 wherein the computer system is separate from a behavior analysis computer system.

12. A computer system as recited in claim 10 wherein the processor executes malicious computer code and wherein the event capture module captures effects of the malicious computer code execution.

13. A computer system as recited in claim 12 wherein the event capture module executes in a user space of the computer system.

14. A computer system as recited in claim 10 further comprising an activity monitor and an event manager operating in a kernel space of the computer system.

15. A computer system as recited in claim 14 wherein the event capture module further comprises an event receiver for interfacing with the activity monitor.

16. A computer system as recited in claim 10 wherein the analysis module further comprises a filter manager for identifying events having a specific process identifier.

17. A computer system as recited in claim 10 wherein the analysis module further comprises an analyzing manager for creating a process stream and a behavior list.

18. A malware-free computer system as recited in claim 10 wherein the specific event data to create a behavior list is indicative of execution of said malware.

* * * * *